(12) United States Patent
Kohno

(10) Patent No.: US 12,194,809 B2
(45) Date of Patent: Jan. 14, 2025

(54) MANAGEMENT SYSTEM FOR COOLING AND WARMING BOX

(71) Applicant: Yazaki Corporation, Tokyo (JP)

(72) Inventor: Yasushi Kohno, Susono (JP)

(73) Assignee: Yazaki Corporation, Tokyo (JP)

( * ) Notice: Subject to any disclaimer, the term of this patent is extended or adjusted under 35 U.S.C. 154(b) by 206 days.

(21) Appl. No.: 18/057,925

(22) Filed: Nov. 22, 2022

(65) Prior Publication Data

US 2023/0079614 A1 Mar. 16, 2023

Related U.S. Application Data

(63) Continuation of application No. PCT/JP2021/021883, filed on Jun. 9, 2021.

(30) Foreign Application Priority Data

Jun. 22, 2020 (JP) ................................. 2020-107184

(51) Int. Cl.
*B60H 1/00* (2006.01)
*G05B 19/4155* (2006.01)
*G06Q 10/0832* (2023.01)

(52) U.S. Cl.
CPC ..... *B60H 1/00585* (2013.01); *G05B 19/4155* (2013.01); *G06Q 10/0832* (2013.01); *G05B 2219/50333* (2013.01)

(58) Field of Classification Search
CPC .......................... G06Q 10/0832; B60H 1/00585
See application file for complete search history.

(56) References Cited

U.S. PATENT DOCUMENTS

| 3,777,507 A | * | 12/1973 | Burton | ................. A01N 1/0205 435/284.1 |
| 10,049,236 B1 | * | 8/2018 | Alkarmi | ................. G06Q 10/08 |
| 2003/0115956 A1 | * | 6/2003 | Moehnke | .......... H01L 21/67253 73/866.5 |
| 2005/0171738 A1 | * | 8/2005 | Kadaba | ................. G07C 5/085 702/187 |

(Continued)

FOREIGN PATENT DOCUMENTS

| JP | 2006-016198 A | 1/2006 |
| JP | 2012-032087 A | 2/2012 |

(Continued)

OTHER PUBLICATIONS

Jul. 20, 2021—International Search Report—Intl App PCT/JP2021/021883.
Nov. 15, 2022—(JP) Office Action—App 2020-107184.

*Primary Examiner* — Henry T Crenshaw
(74) *Attorney, Agent, or Firm* — Banner & Witcoff, Ltd.

(57) ABSTRACT

A sensor is attached to a cooling and warming box accommodating a cooling agent. A server device manages a transportation company that requests transportation of the cooling and warming box. The server device wirelessly receives box information indicating a detection result from the sensor. The server device receives replacement information of the cooling and warming agent accommodated in the cooling and warming box from a freezing center. The server device sends the box information and the replacement information received wirelessly to the managed transportation company.

4 Claims, 4 Drawing Sheets

(56) References Cited

U.S. PATENT DOCUMENTS

| | | | | |
|---|---|---|---|---|
| 2008/0197139 | A1* | 8/2008 | Goncharko | F25D 3/06 |
| | | | | 220/592.25 |
| 2009/0058239 | A1* | 3/2009 | Kuo | G06Q 50/40 |
| | | | | 312/236 |
| 2010/0299278 | A1* | 11/2010 | Kriss | G06Q 10/08 |
| | | | | 705/332 |
| 2017/0261237 | A1* | 9/2017 | High | F25B 9/04 |
| 2019/0112119 | A1* | 4/2019 | Alexander | A47J 36/2483 |
| 2021/0037813 | A1* | 2/2021 | Scalea | G06Q 10/0832 |
| 2023/0419240 | A1* | 12/2023 | Aalto | G06Q 10/0832 |

FOREIGN PATENT DOCUMENTS

| | | | |
|---|---|---|---|
| JP | 2015-187857 | A | 10/2015 |
| JP | 2019-028965 | A | 2/2019 |
| JP | 2019-159394 | A | 9/2019 |

\* cited by examiner

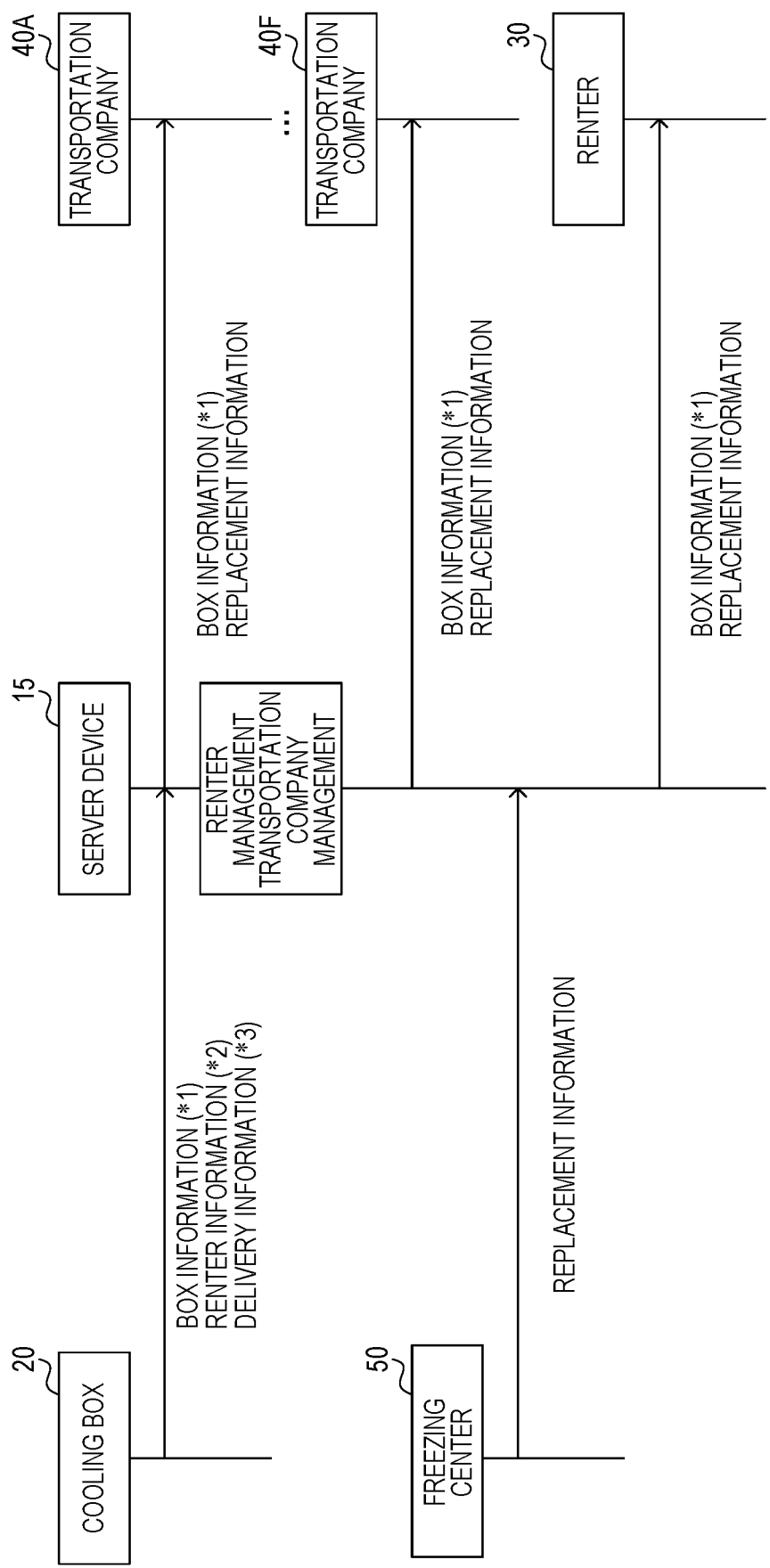

MANAGEMENT SYSTEM FOR COOLING AND WARMING BOX

CROSS REFERENCE TO RELATED APPLICATIONS

This application is a continuation of PCT application No. PCT/JP2021/021883, which was filed on Jun. 9, 2021 based on Japanese patent application 2020-107184 filed on Jun. 22, 2020, whose contents are incorporated herein by reference. Also, all the references cited herein are incorporated as a whole.

BACKGROUND OF THE INVENTION

Technical Field

The present invention relates to a management system for a cooling and warming box.

Background Art

In the related art, a cooling box is used for storing and transporting foods and the like (Patent Literature 1). A cooling agent is accommodated in the cooling box. A business that uses this cooling box for transportation or lends the cooling box is considered. For this reason, there is a request from a transportation company that transports the cooling box or a renter who rents the cooling box to know a state of the cooling box.

CITATION LIST

Patent Literature

Patent Literature 1: JP-A-2012-032087

SUMMARY

The present invention is made in view of the above circumstances, and an object of the present invention is to provide a management system for a cooling and warming box, which can easily inform a transportation company or a renter of a state of a cooling box.

Solution to Problem

According to an embodiment, a management system for a cooling and warming box, includes,
a sensor that is attachable to a cooling and warming box accommodating a cooling and warming agent;
a management unit that manages a transportation company that transports the cooling and warming box or a renter who rents the cooling and warming box; and
an information sending unit that sends a detection result from the sensor to the transportation company or the renter managed by the management unit.

BRIEF DESCRIPTION OF THE DRAWINGS

FIG. 5 is a sequence diagram for explaining operations of the management system for a cooling box shown in FIG. 2.

DETAILED DESCRIPTION OF EMBODIMENTS

A specific embodiment according to the present invention will be described below with reference to the drawings.

There are two types of a cooling box 20 used in a management system 10 for a cooling box of the present embodiment, for example, for freezing and for refrigeration. The cooling box 20 for refrigeration is made to maintain a temperature inside the box at 0° C. to 10° C. without a power source by a cooling agent such as dry ice or a cooling gel. The cooling box 20 for freezing is made to maintain a temperature inside the box at −15° C. or lower without a power source by a cooling agent such as dry ice or a cooling gel. The cooling box 20 accommodates items that need to be frozen or refrigerated, such as fresh food. Nitrogen or carbon dioxide may be injected into the cooling box 20 or the cooling box 20 may have an ethylene decomposition function.

The management system 10 for a cooling box of the present embodiment (hereinafter simply abbreviated as "management system 10") is a system that manages a renter 30 who rents the above cooling box 20, and informs the renter 30 of a state inside the cooling box 20 in real time. The management system 10 is also a system that manages transportation companies 40A to 40F that request transportation of the cooling box 20 when the renter 30 transports goods using the cooling box 20, and informs the transportation companies 40A to 40F of the state inside the cooling box 20 in real time.

Figure 1:
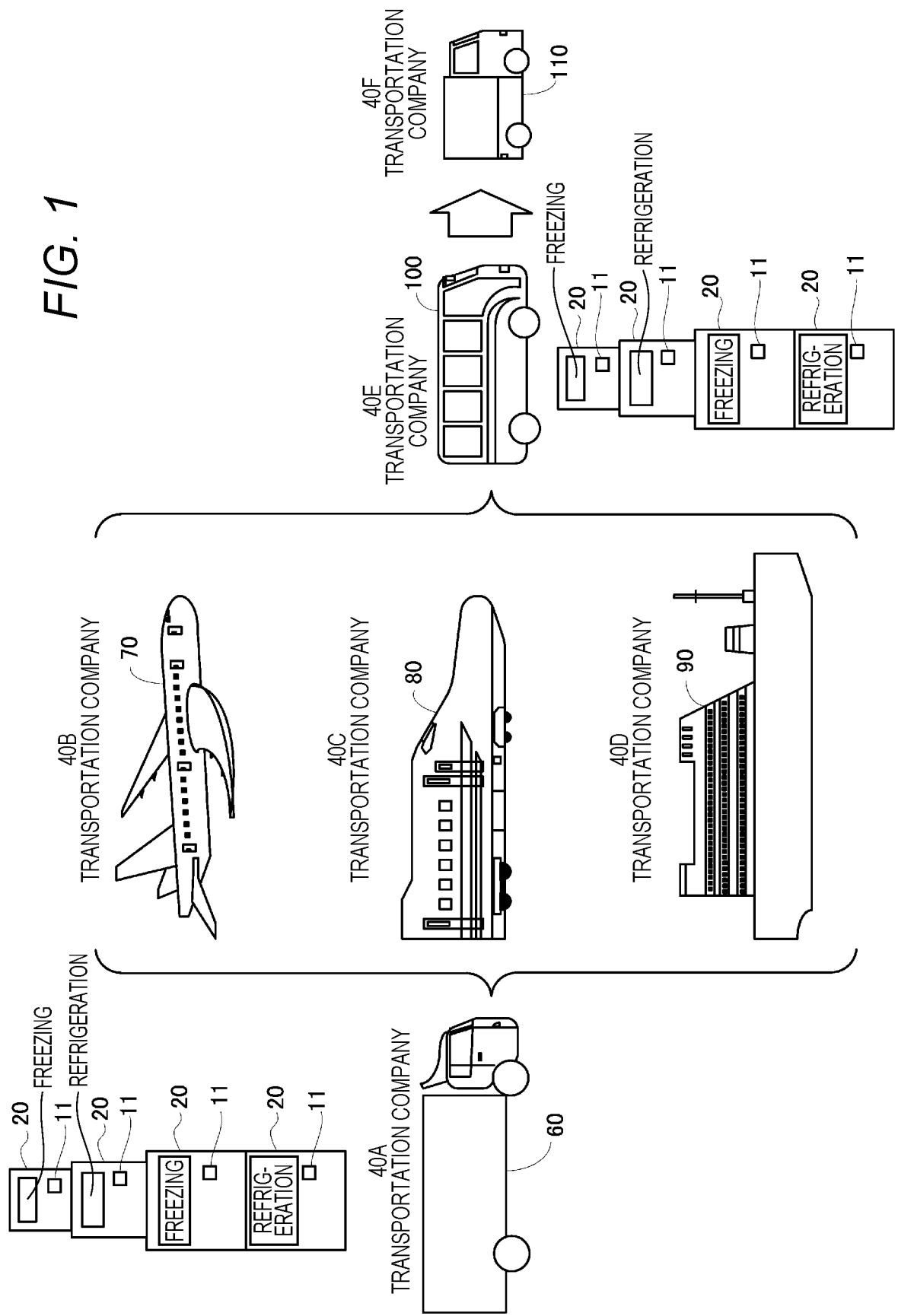
FIG. 1 is an explanatory diagram for explaining an example of distribution to which a management system for a cooling box of the present invention is applied.

As shown in FIG. 1, the management system 10 is requested to transport the cooling box 20 by not only the transportation companies 40A and 40F that specialize in goods delivery, but also the transportation companies 40B to 40E such as an airplane 70, a train 80, a ferry 90, a bus 100, and the like that transport goods and passengers together. The management system 10 may accept transportation requests from the plurality of transportation companies 40A to 40F when the cooling box 20 is transported from a sender to a delivery destination. In an example shown in FIG. 1, the cooling box 20 is sequentially transferred in an order of a heavy-duty truck 60 owned by the transportation company 40A, the airplane 70, train 80, or ferry 90 owned by the transportation company 40B, 40C, or 40D, the bus 100 owned by the transportation company 40E, and a light truck 110 owned by the transportation company 40F, and transported from the sender to the delivery destination.

Figure 2:
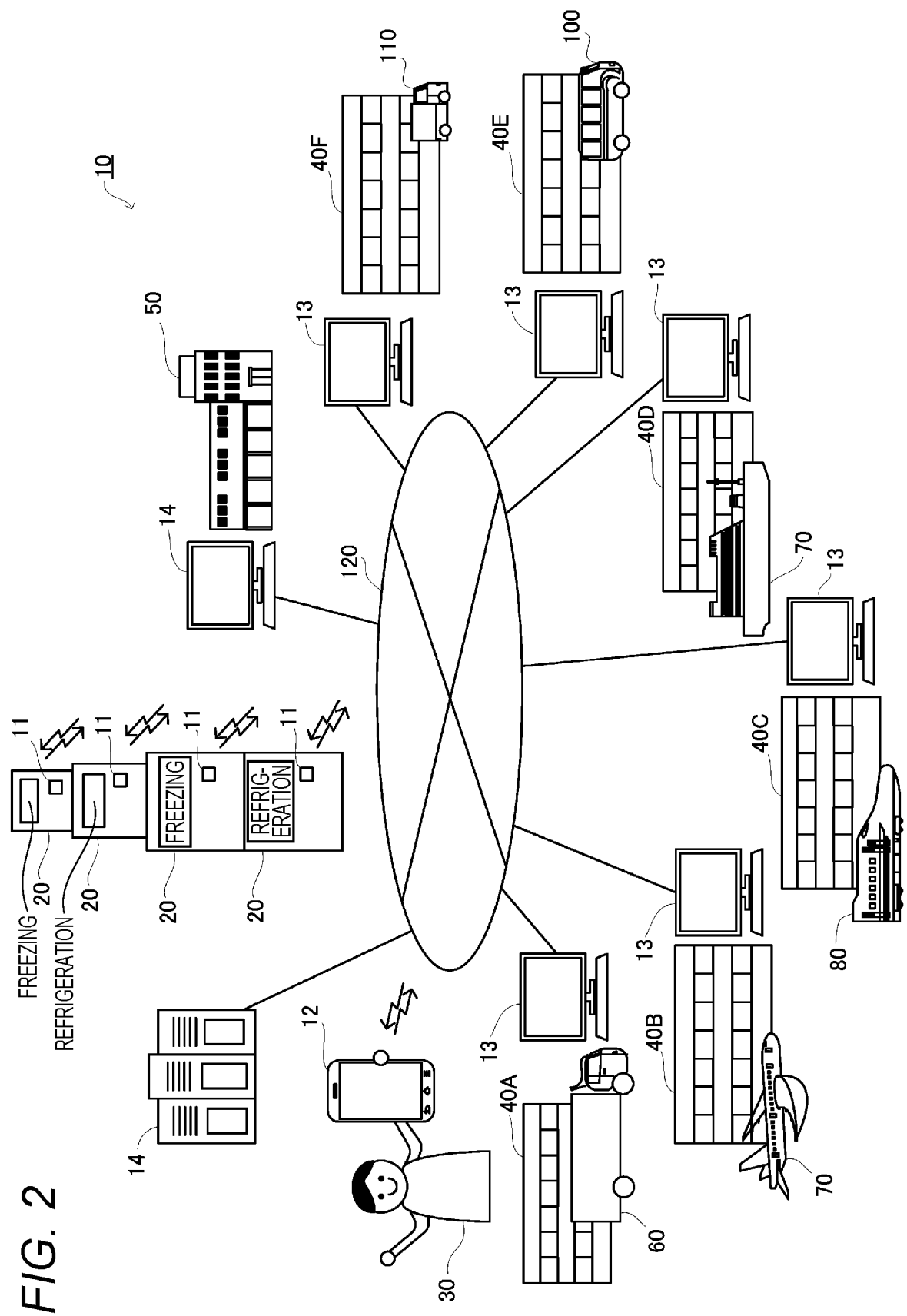
FIG. 2 is a configuration diagram showing an embodiment of the management system for a cooling box of the present invention.

Next, the management system 10 of the present embodiment will be described with reference to FIG. 2. The management system 10 of the present embodiment includes a sensor-equipped wireless device 11 attached to the cooling box 20, a renter terminal 12 owned by the renter 30 of the cooling box 20, a transportation company terminal 13 owned by the transportation companies 40A to 40E, a center terminal 14 owned by a freezing center, and a server device 15. The sensor-equipped wireless device 11, the renter terminal 12, the transportation company terminal 13, the center terminal 14, and the server device 15 are provided so as to be able to communicate with each other via the Internet communication network 120.

Figure 3:
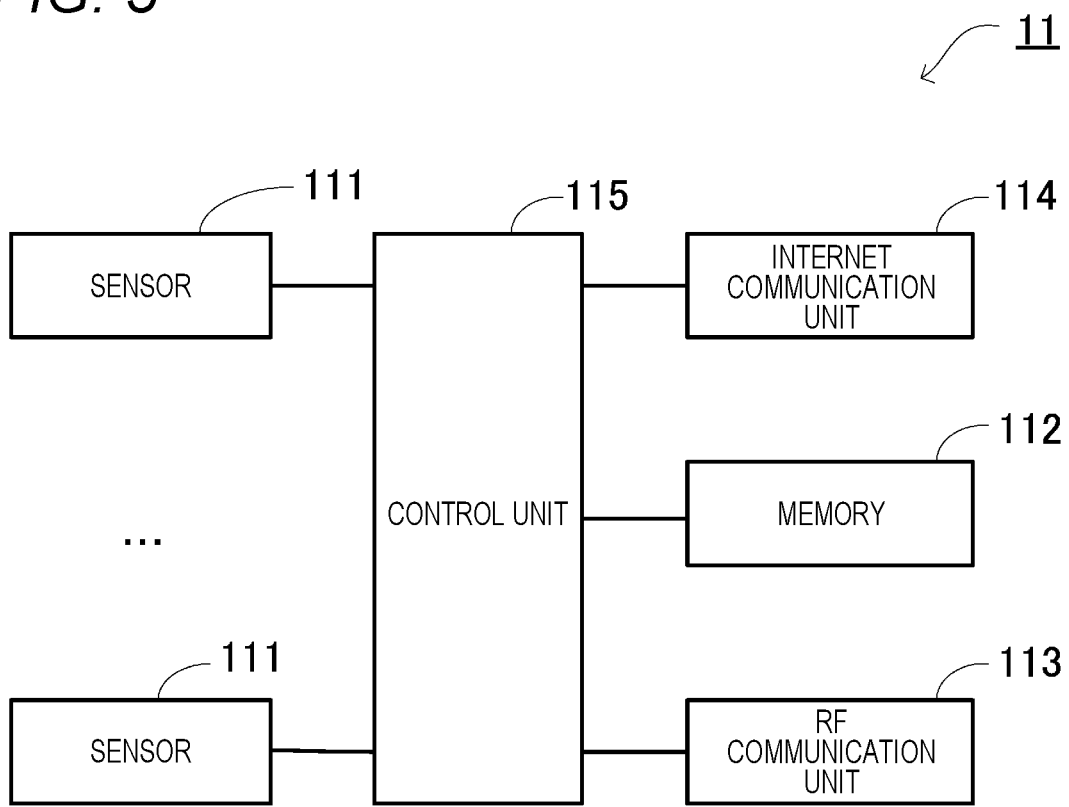
FIG. 3 is a configuration diagram of a sensor-equipped wireless device attached to a cooling box shown in FIG. 2.

As shown in FIG. 3, the sensor-equipped wireless device 11 includes various sensors 111, a memory 112, an RF communication unit 113, the Internet communication unit 114, and a control unit 115. The various sensors 111 detect the temperature inside the cooling box 20, a temperature of the cooling agent, a position, a humidity, an atmosphere composition, vibration, and the like. Detection results of the sensors 111 are periodically recorded in the memory 112. The RF communication unit 113 can wirelessly communicate with an RF reader and writer (not shown) to write information in the memory 112 in a non-contact manner.

The Internet communication unit 114 includes a circuit, an antenna, or the like for connecting to the Internet communication network 120. The control unit 115 includes a central processing unit (CPU) provided with a memory such as a random access memory (RAM) or a read only memory (ROM), and controls the entire sensor-equipped wireless device 11.

The renter terminal 12, the transportation company terminal 13, and the center terminal 14 includes a PC, a tablet, a smartphone, or the like provided with a built-in computer that operates according to a program. In an example shown in FIG. 2, the renter terminal 12 includes a tablet or a smartphone, and the transportation company terminal 13 and the center terminal 14 includes a PC.

Figure 4:
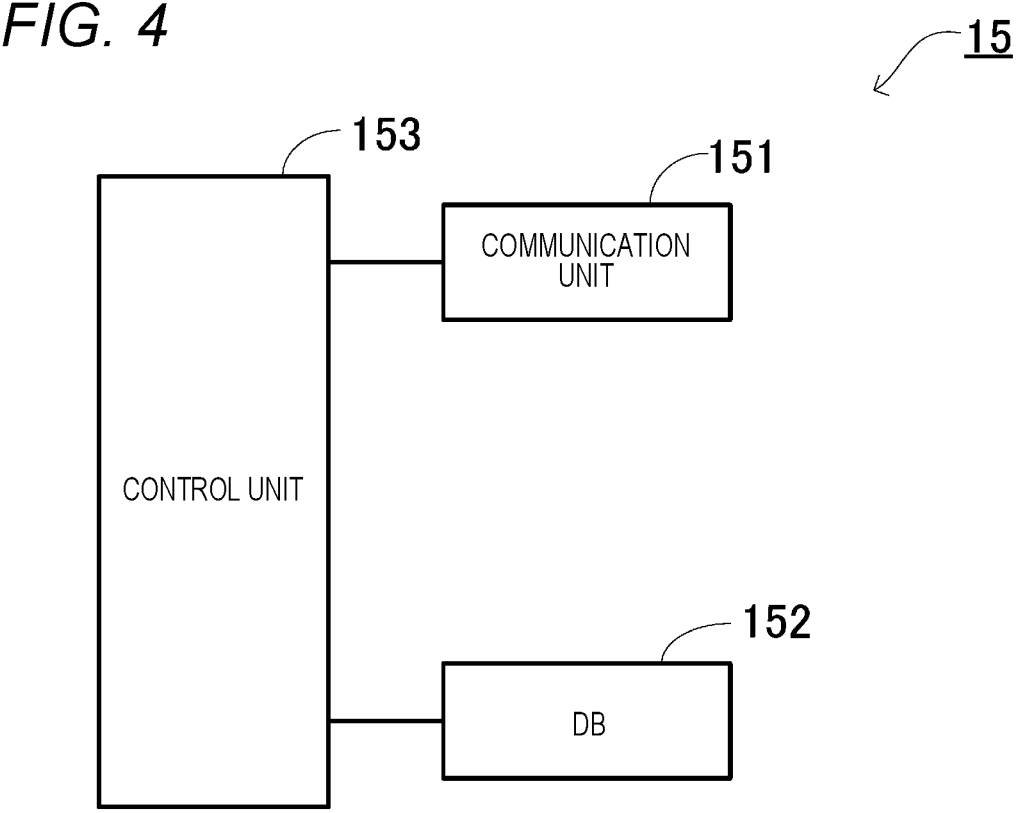
FIG. 4 is a configuration diagram of a server device shown in FIG. 2.

The server device 15 is owned by a company that provides the management system 10, and includes a communication unit 151, a DB 152, and a control unit 153, as shown in FIG. 4. The communication unit 151 includes a circuit or the like for connecting to the Internet communication network 120. The DB 152 records management information of the renter 30 who rents the cooling box 20 and the transportation companies 40A to 40F that transport the cooling box 20. The control unit 153 includes a CPU provided with a memory such as an RAM or an ROM, and controls the entire server device 15.

Next, operations of the management system 10 having the above configuration will be described with reference to FIG. 5. In FIG. 5, a note "*1" indicates box information such as temperature, temperature of cooling agent, position, humidity, atmosphere composition, vibration, and the like. A note "*2" indicates renter information that associates with renter who rents cooling box. Anote "*3" indicates delivery information that is an information of sender and delivery destination of cooling box. The renter 30, the transportation companies 40A to 40F, and the freezing center 50 install an application for the management system 10 on the terminals 12 and 13, input registration information using the installed application, and send the registration information to the server device 15.

The cooling box 20 can be rented, for example, at a store that sells fresh foods and the like. The renter 30 tells a clerk of the store that he or she wants to rent the cooling box 20 to deliver a purchased product. The renter 30 informs the clerk of renter information (an ID of the renter) of the renter 30 obtained when registering to the management system and a delivery destination. The clerk packs the purchased product of the renter 30 in the cooling box 20. The clerk uses an RF reader and writer (not shown) to write the renter information, the sender, and delivery information indicating the delivery destination in the memory 112 in the sensor-equipped wireless device 11 attached to the cooling box 20.

When the renter information and the delivery information are written, the control unit 115 of the sensor-equipped wireless device 11 attached to the cooling box 20 (hereinafter, simply abbreviated as "cooling box 20") assigns an ID of the cooling box 20 to the renter information and the delivery information and sends to the server device 15. When the renter information and the delivery information are written, the cooling box 20 periodically assigns the ID of the cooling box 20 to box information indicating the detection results detected by the sensors 111 and sends the box information to the server device 15.

The server device 15 functions as a management unit, and when receiving the renter information from the cooling box 20, the server device 15 performs rental management of the cooling box 20 by associating the renter information with the ID of the cooling box 20 assigned to the renter information. When receiving the delivery information, the server device 15 determines the transportation companies 40A to 40F to which delivery from the sender to the delivery destination is requested, and sends a transportation request to the transportation company terminal 13 of the determined transportation companies 40A to 40F.

The server device 15 also functions as an information sending unit, and when receiving a sending request for the box information from the renter terminal 12 owned by the renter 30 or the transportation company terminal 13 of the transportation companies 40A to 40F to which the transportation is requested, the server device 15 sends the periodically sent box information to the renter terminal 12 and the transportation company terminal 13.

When the cooling box 20 is transported for a long distance and for a long time, the cooling agent can be replaced by stopping at the freezing center 50. When the cooling agent is replaced at the freezing center 50, replacement information indicating a type and the number of the cooling agent replaced from the center terminal 14, a location and a time for the replacement, and the like is sent to the server device 15.

When receiving the sending request for the box information from the renter terminal 12 owned by the renter 30 or the transportation company terminal 13 of the transportation companies 40A to 40F to which the transportation is requested, the server device 15 sends the above replacement information to the renter terminal 12 and the transportation company terminal 13, in addition to the periodically sent box information.

According to the above embodiment, the server device 15 sends the detection results from the sensors 11 attached to the cooling box 20 to the transportation companies 40A to 40F or the renter 30 managed by the server device 15. As a result, the state of the cooling box 20 can be easily informed to the transportation companies 40A to 40F or the renter 30.

According to the above embodiment, the detection results from the sensor 111 are sent to the server device 15 via wireless communication. As a result, the state of the cooling box 20 can be informed to the transportation companies 40A to 40F and the renter 30 in real time.

According to the above embodiment, the delivery information and the renter information written in the memory 112 are sent to the server device 15 via wireless communication, and the server device 15 manages the transportation companies and the renter based on the delivery information and the renter information. As a result, the delivery information and the renter information can be sent to the server device 15 by writing the delivery information and the renter information to the memory 112 attached to the cooling box 20.

According to the above embodiment, the server device 15 can also inform the transportation companies 40A to 40F and the renter 30 of the replacement information received from the freezing center 50.

The present invention is not limited to the above embodiment, and modifications, improvements, and the like can be made as appropriate. In addition, materials, shapes, dimensions, numbers, arrangement positions, and the like of each constituent element in the above embodiment are optional and not limited as long as the present invention can be achieved.

For example, according to the above embodiment, the box information is directly sent from the sensor-equipped wireless device 11 to the server device 15, but the present invention is not limited thereto. If means for transportation such as the heavy-duty truck 60, airplane 70, train 80, ferry 90, bus 10, and light truck 110 owned by the transportation companies 40A to 40F are equipped with a wireless device that can be connected to the Internet communication network 120, the box information may be sent to the server device 15 via the wireless device.

According to the above embodiment, the cooling box 20 accommodating the cooling agent is used, but the present invention is not limited thereto. Instead of the cooling box 20, or in addition to the cooling box 20, a warming box accommodating a warming agent may be used.

According to the above embodiment, the box information is sent to both the transportation companies 40A to 40F and the renter 30, but the present invention is not limited thereto. The box information may be sent to either the transportation companies 40A to 40F or the renter 30.

According to the above embodiment, the box information is wirelessly sent to the server device 15, but the present invention is not limited thereto. After delivery of the cooling box 20, contents in the memory 112 may be read by using an RF reader and writer and sent to the server device 15.

According to the above embodiment, the delivery information and the renter information written in the memory 112 are sent to the server device 15, but the present invention is not limited thereto. The delivery information and the renter information may be input to a terminal installed in the store where the cooling box 20 is rented to be sent from the terminal to the server device 15.

According to the above embodiment, the server device 15 sends the replacement information to the transportation companies 40A to 40F or the renter 30, but the present invention is not limited thereto. It is not mandatory to send the replacement information.

According to an embodiment, a management system (10) for a cooling and warming box may include,
a sensor (111) that is attachable to a cooling and warming box (20) accommodating a cooling and warming agent:
a management unit (153) that manages a transportation company (40A to 40F) that transports the cooling and warming box (20) or a renter (30) who rents the cooling and warming box (20); and
an information sending unit (153) that sends a detection result from the sensor (111) to the transportation company (40A to 40F) or the renter (30) managed by the management unit (153).

According to the management system for a cooling and warming box having a configuration of the above, the information sending unit sends the detection result from the sensor attached to the cooling and warming box to the transportation company or the renter managed by the management unit. As a result, it is possible to easily inform the transportation company or the renter of the state of the cooling and warming box.

In the management system (10) for a cooling and warming box,
the detection result from the sensor (111) may be sent by the information sending unit (153) via wireless communication.

According to the management system for a cooling and warming box having a configuration of the above, the detection result from the sensor is sent by the information sending unit via wireless communication. As a result, it is possible to inform the transportation company or the renter of the state of the cooling and warming box in real time.

The management system (10) for a cooling and warming box may further include:
a memory (112) that is attachable to the cooling and warming box (20) and in which delivery information indicating a sender and a delivery destination of the cooling and warming box or renter information is written, in which
the delivery information or the renter information written in the memory (112) is sent to the management unit (153) via wireless communication, and
the management unit (153) manages the transportation company (40A to 40F) or the renter (30) based on the delivery information or the renter information.

According to the management system for a cooling and warming box having a configuration of the above, the delivery information or the renter information written in the memory is sent to the management unit via wireless communication, and the management unit manages the transportation company or the renter based on the delivery information or the renter information. As a result, the delivery information or the renter information can be sent to the management unit by writing the delivery information or the renter information in the memory attached to the cooling and warming box.

In the management system (10) for a cooling and warming box, the information sending unit (153) may sends the detection result from the sensor (111) and replacement information indicating that the cooling agent is replaced during transportation to the transportation company (40A to 40F) or the renter (30) managed by the management unit (153).

According to the management system for a cooling and warming box having a configuration of the above, replacement information of the cooling and warming agent can also be informed to the transportation company or the renter.

According to the present invention, it is possible to provide a management system for a cooling and warming box, which can easily inform a transportation company or a renter of a state of the cooling and warming box.

Although the present invention is described in detail with reference to a specific embodiment, it is apparent to those skilled in the art that various changes and modifications can be made without departing from the spirit and scope of the present invention.

What is claimed is:

1. A management system for a cooling and warming box, comprising:
a sensor that is attachable to the cooling and warming box configured to heat and cool an object placed in the cooling and warming box, the sensor configured to detect a temperature of the cooling and warming box when the sensor is attached to the cooling and warming box;
a memory that is attachable to the cooling and warming box and in which delivery information indicating a sender and a delivery destination of the cooling and warming box is written; and
a computing system storing computer-readable instructions that, when executed, cause the computing system to:

manage information associated with a transportation company that transports the cooling and warming box or a renter who rents the cooling and warming box; and send a detection result from the sensor to the transportation company or the renter managed by the computing system, wherein:

upon receiving an ID of the cooling and warming box after the sensor and memory are attached to the cooling and warming box and a renter information indicating a renter who has rented the cooling and warming box, manage the ID of the cooling and warming box by associating the renter information with the ID of the cooling and warming box, and send a detection result received from the sensor to the transportation company, or to the renter who corresponds to the ID of the cooling and warming box after the sensor and memory have been attached to the cooling and warming box.

2. The management system for a cooling and warming box according to claim 1, wherein
the detection result from the sensor is sent by the computing system via wireless communication.

3. The management system for a cooling and warming box according to claim 1, wherein
the delivery information written in the memory is sent to the computing system via wireless communication, and
the computing system manages the information associated with the transportation company or the renter based on the delivery information or the renter information.

4. The management system for a cooling and warming box according to claim 1, wherein
the computing system sends the detection result from the sensor and replacement information indicating that the cooling agent is replaced during transportation to the transportation company or the renter.

* * * * *